United States Patent [19]

Herter, deceased et al.

[11] 4,345,610
[45] Aug. 24, 1982

[54] PROCESS AND DEVICE FOR THE MIXING OF GASES

[76] Inventors: Martin Herter, deceased, late of Pulheim-Geyen, Fed. Rep. of Germany; by Johanna Herter, heiress, Romerfeldstr. 9, 5024 Pulheim-Geyen, Fed. Rep. of Germany; by Ingrid Radtke, heir, Schlehenweg 4, 4047 Dormagen 1 (Delhoven), Fed. Rep. of Germany; by Manfred Herter, heir, Im Bachgarten 56, 5024 Pulheim, Fed. Rep. of Germany; Werner Oppel, Saarstr. 46, 5083 Rodenkirchen, Fed. Rep. of Germany

[21] Appl. No.: 142,460

[22] Filed: Apr. 21, 1980

[30] Foreign Application Priority Data

Apr. 20, 1979 [DE] Fed. Rep. of Germany ....... 2915983

[51] Int. Cl.³ ............................................. G05D 11/13
[52] U.S. Cl. ......................................... 137/7; 137/88; 137/624.15; 137/624.2
[58] Field of Search .................. 137/7, 12, 88; 137/624.15, 624.18, 624.2

[56] References Cited

U.S. PATENT DOCUMENTS

| | | | |
|---|---|---|---|
| 3,478,767 | 11/1969 | Kister | 137/88 |
| 3,739,800 | 6/1973 | Aasen et al. | 137/93 |
| 3,762,428 | 10/1973 | Beck et al. | 137/88 |
| 3,897,798 | 8/1975 | De Vale | 137/88 |
| 3,956,772 | 5/1976 | Cox | 251/129 |
| 4,004,884 | 1/1977 | Zdrodowski | 137/88 |
| 4,023,587 | 5/1977 | Dobritz | 137/88 |
| 4,064,898 | 12/1977 | Petersen et al. | 137/624.2 |
| 4,098,247 | 7/1978 | Konishi et al. | 137/624.2 |
| 4,135,548 | 1/1979 | Sears | 137/392 |
| 4,162,689 | 7/1979 | Zdrodowski | 137/88 |
| 4,219,038 | 8/1980 | Lubitzsch et al. | 137/88 |
| 4,236,546 | 12/1980 | Manley et al. | 137/88 |
| 4,262,686 | 4/1981 | Heim et al. | 137/7 |

Primary Examiner—H. Jay Spiegel
Attorney, Agent, or Firm—Bacon & Thomas

[57] ABSTRACT

In an installation for treating workpieces by a glow discharge in a mixture of gases, the gas pressure is detected and valves for the various gases are cyclically and symmetrically opened and closed by amounts relative to the volumetric ratio of the gases.

5 Claims, 3 Drawing Figures

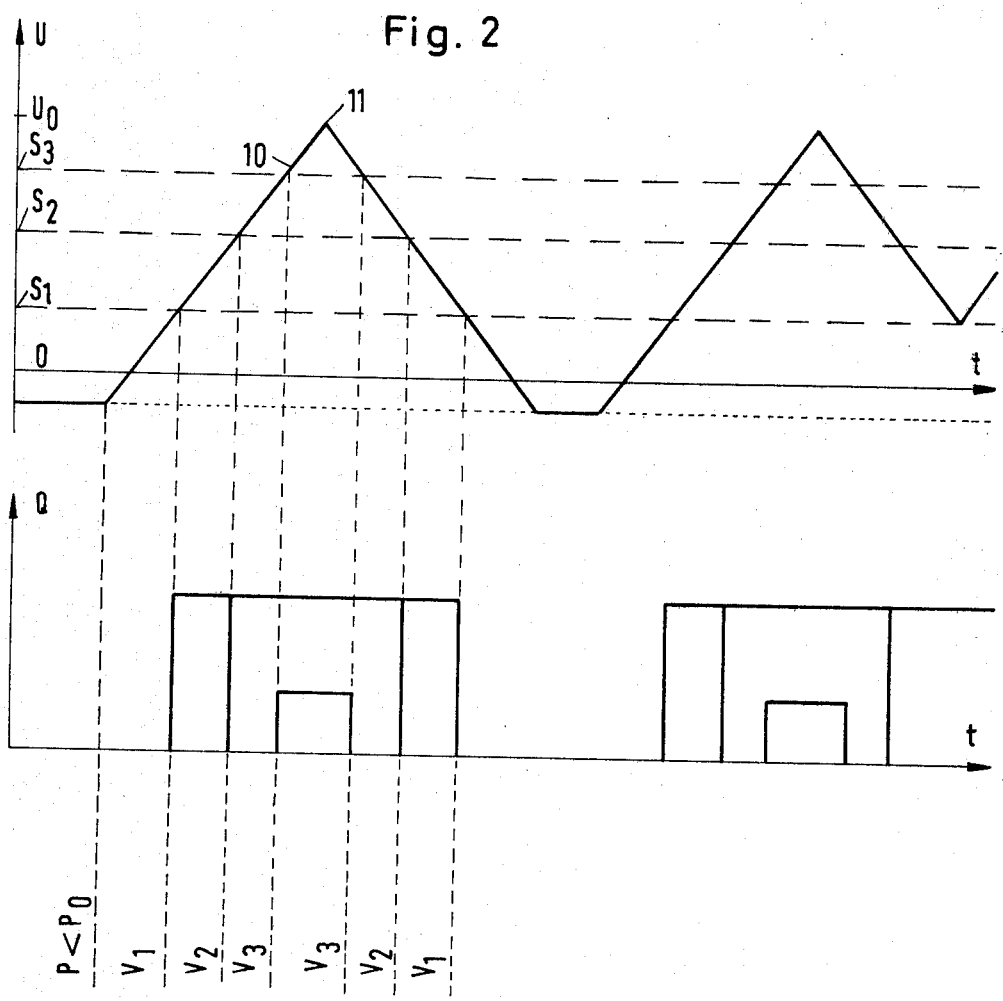

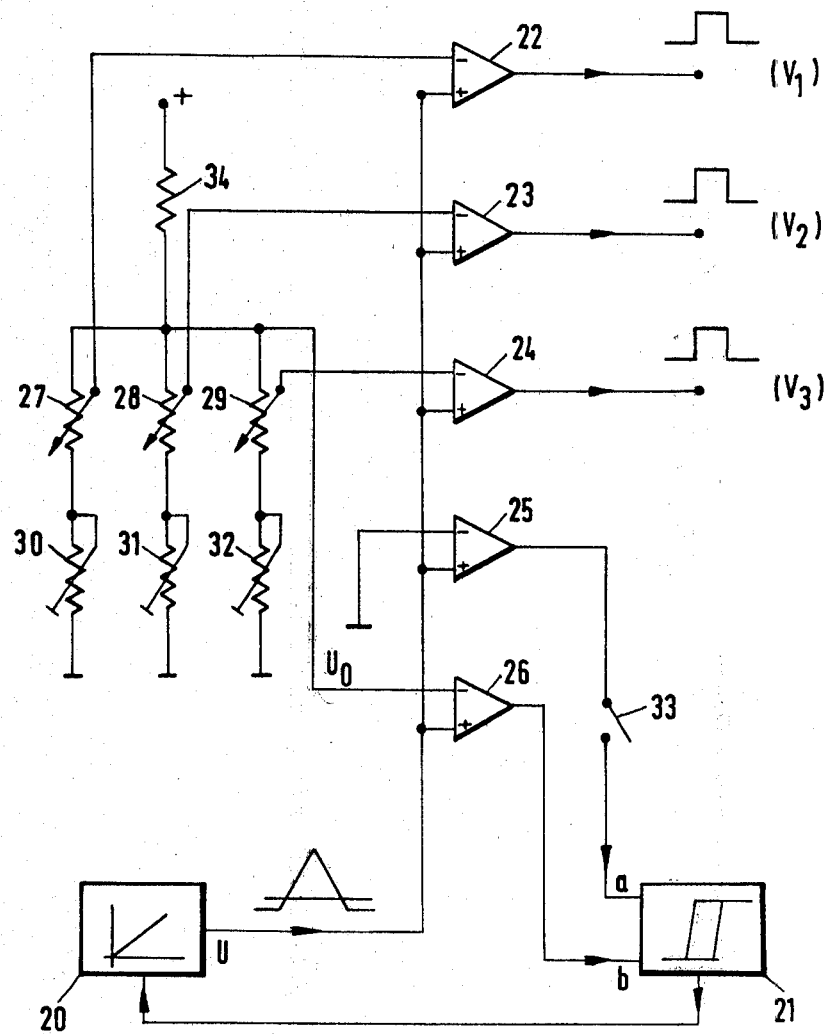

PROCESS AND DEVICE FOR THE MIXING OF GASES

BACKGROUND OF THE INVENTION

The invention concerns a process for the mixing of gases, particularly for installations for the treatment of workpieces with the aid of plasma discharges, such as glow discharges, whereby the gases are introduced in corresponding amounts by way of metering valves into a mixing chamber, whenever the pressure in said mixing chamber drops below a predetermined value: the mixture of gases being passed from the mixing chamber to a consumer.

Gas mixing installations for small volumes of gas, such as those needed for the treatment of workpieces by means of glow discharge, may be readily constructed with the aid of the flow meters and needle valves or flow regulators. Herein, however, the accuracy and reproducibility of the mixing ratio that may be attained presents a problem: these values are low. In case of a varying rate of removal of the gas, the mixing ratio is not constant. Furthermore, any change in the mixture must be adjusted manually during the operational flow of the gas, in keeping with the indication of the flow meter.

SUMMARY OF THE INVENTION

It is the object of the present invention to provide a process of the above-mentioned type, whereby it is possible to produce a gaseous mixture with a composition as accurate and reproducible as possible and wherein the composition of the gas may be varied without difficulty during a given treatment or from one treatment to another.

The object is attained by providing metering valves which are fixedly adjusted for a given type of gas and are opened and closed symmetrically and cyclically with respect to time. The opening times of the individual metering valves being selected in keeping with the percentage volume ratio, while effecting at least one cycle.

In this manner, continuous regulation of the composition of the gas and potentially its programming may be effected, wherein by virtue of the time symmetrical and cyclic opening and closing of the valves very high accuracy and reproducibility of the gas composition may be achieved, this accuracy and reproducibility being much better than those obtainable by the sequential opening of metering valves. It is being assumed thereby that the mixing chamber is large enough so that the rise in pressure therein is proportional to the volume of gas admitted.

Conveniently, a sawtooth voltage is produced, which for each individual gas, upon the attainment of an adjustable nominal voltage, actuates the controls for opening or closing. The sawtooth voltage may also be set digitally, in the form of small steps.

Conveniently, the metering valves are calibrated by determining the time it takes to obtain a predetermined difference in pressure, by means of filling a gas into the mixing chamber, for all of the metering valves and adjusting the metering valves themselves if a given range of tolerances is exceeded, while fine settings are effected by the variation of a correction element of the electronic control of the metering valves.

BRIEF DESCRIPTION OF THE DRAWINGS

Further characteristics and advantages of the invention will be found in the description hereinbelow.

The invention is explained in more detail with the aid of the embodiment represented in the figures attached hereto.

FIG. 2 shows the principle of gas metering in the form of a diagram, wherein in the top part of the diagram the sawtooth voltage for the opening of the valves is plotted against time, and in the bottom part of the volume of gas flow and the opening times of the individual valves are entered as a function of the sawtooth voltage.

FIG. 3 shows schematically the circuit diagram of the electronic controls of the metering valves.

DESCRIPTION OF A PREFERRED EMBODIMENT

Figure 1:
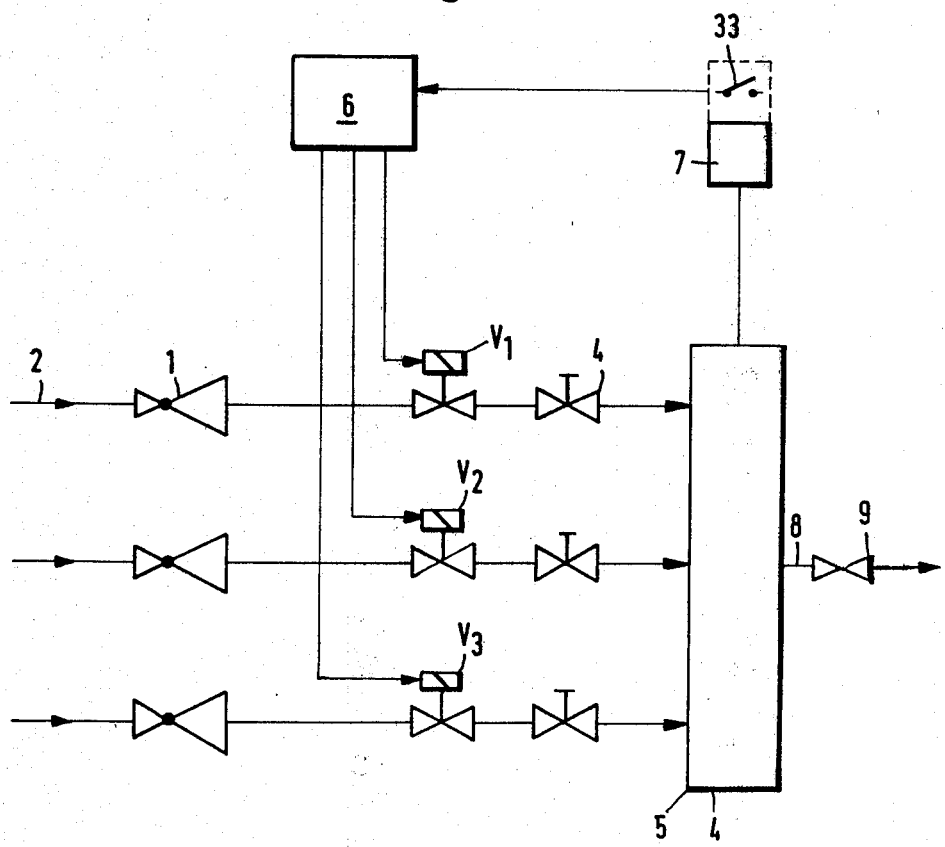
FIG. 1 shows schematically a gas mixing installation according to the invention.

In a gas mixing installation operating by the process of the invention, the gases to be mixed, taken for example from gas bottles, are conveniently conducted through copper tubing, with the copper tubes being soldered to each other. This provides a good equalization among the gases. With regard to temperature. Subsequent pressure reducers 1 bring each gas to a constant overpressure, for example, 2-bar. Because the constancy of this pressure is highly important for the satisfactory operation of the gas mixing installation, this value of the pressure is displayed for each gas conveniently by a manometer, not shown. Subsequently, pressure switches may be provided in each supply line 2, serving to sense the prepressure and deactivating the gas mixing installation in case of an empty gas bottle while displaying a warning signal.

The supply lines 2 lead to magnetic valves $V_1$, $V_2$ or $V_3$ and metering valves 4, inserted in series, to a mixing chamber 5, while the valves V and 4 control the volume of gas admitted. The metering valves 4 are adjusted only once during the calibration of the gas mixing installation for the type of gas involved. The production of different mixtures is then effected exclusively by means of the correct actuation with respect to time of the magnetic valves V by way of an electronic control circuit 6, which is actuated by a pressure controller 7, connected with the mixing chamber 5.

Whenever a predetermined pressure $p_o$ is not present in the mixing chamber, i.e., $p < p_o$, the control circuit 6 generates a slowly rising voltage 10. When the set value $S_1$, $S_2$, $S_3$, predetermined for each gas, is exceeded by the voltage 10, the magnetic valves open successively and permit the flow of gas into the mixing chamber 5. After reaching a maximum value 11, the voltage 10 declines at a rate equal to that of its ascent, whereupon the magnetic valves V are closed in steps.

If following the closing of the last magnetic valve $V_1$, the pressure p in the mixing chamber 5 should remain lower than $p_o$ as the result of a high rate of outflow, a new cycle will be initiated upon the attainment of the lowest set value $S_1$, so that the associated magnetic valve $V_1$ will remain open. Otherwise, the voltage 10 will decline to its initial level. According to FIG. 2, the magnetic valves $V_1$ and $V_2$ permit the flow of an equal volume of gas Q per unit time, while the magnetic valve $V_3$ passes a smaller volume only. This is not an absolute requirement, but it is convenient, when the time period during which a magnetic valve V for a certain gas, of which relatively low amounts compared to another gas are required, is adequate to obtain the desired accuracy of adjustment of the mixture of gases. For this reason, the flow of gas through the valve per unit time may be reduced in order to extend the time of opening of the magnetic valve $V_3$, as shown in FIG. 2.

A minimum in mixing error is attained practically independently of rising pressures in the mixing chamber 5, by means of the control of cycles symmetrically with respect to time.

The setting of the set values $S_1$, $S_2$, $S_3$ is preferably digital in %, with an approximate resolution of 0.1% or 0.01%, depending on the type of gas, while the opening periods of time of the magnetic valves V are of the order of seconds.

The mixture of gasses in the mixing chamber 5 may be taken from the chamber by way of an outlet line 8, having a valve 9.

The mixing chamber 5 must be large enough to provide a buffer effect, so that in practice the average in time is always the essential factor.

The control circuit 6 shown in FIG. 3 has an integrator 20, supplying the sawtooth voltage 10 of FIG. 2. Its inlet is connected with the outlet of a Schmitt trigger 21, while its outlet is linked with an inlet each of the comparators 22 to 26, which may be operation amplifiers. Another inlet each of the comparators 22 to 24—their outlets serving to control the the magnetic valves $V_1$ to $V_3$—is connected with the reference value potentiometers 27 to 29 for the setting of the volume proportion to each of the gases, said potentiometers in turn being preceded by regulating units 30 to 32 as the correction elements for the fine setting during calibration. A further inlet of the comparator 25 is grounded and its outlet connected by way of the pressure switch 33 of the pressure regulator 7 with a first inlet a of the Schmitt trigger 21, the second inlet b hereof being positively precharged with a voltage $U_o$, by way of resistance 34.

The outlet of the integrator 20 is normally limited negatively at 2 to 3 V. The comparators 22 to 26 then have a negative potential at the outlet. As soon as $p < p_o$, the pressure switch 33 closes and a negative potential is at the inlet a of the Schmitt trigger 21. The Schmitt trigger 21 thus jumps to a negative outlet potential, which then is applied to the inlet of the integrator 20, the outlet potential of which is slowly rising in the positive direction. When the set values $S_1$, $S_2$, $S_3$ of the comparators 22 to 24 are exceeded, the individual valves $V_1$, $V_2$, $V_3$ open. When the voltage of the integrator becomes $U > U_o$, the outlet of the comparator 26 becomes positive and the outlet of the Schmitt trigger 21 jumps to a positive potential. This effects a slow running down of the integrator 20. The comparators 22 to 26 switch back, so that the valves $V_1$, $V_2$, $V_3$ are closing. When U is less than or equal to 0 and p remains smaller than $p_o$, a new cycle starts immediately. If, however, the pressure switch 33 is open, the Schmitt trigger 21 is not actuated and the integrator 20 runs against the negative limit.

BACKGROUND OF THE INVENTION

A time division blending system is described in U.S. Pat. No. 4,004,884. In such systems, different fluids from a plurality of reservoirs are blended sequentially opening and closing valves in the outlet lines leading from each reservoir for a fixed time ratio of the total valve cycle period. The amount of each different fluid obtained in the final fluid stream is directly proportional to the time the corresponding valve is open during said cycle. One is thus able to obtain reproducible and highly accurate concentrations of a number of different fluids in the final fluid system.

The characteristic of the opening of and the flow through the metering valves shown in FIG. 2 is especially suitable for installations for the nitriding hardening of workpieces by means of gas and particularly anomalous glow discharge, because therein a mixture of $N_2$, $H_2$, possibly with a slight addition of $CH_4$, is required. The setting ranges then may vary between 0 and 100% for $N_2$ and $H_2$ and between 0 and 1% for $CH_4$.

We claim:

1. In a process for mixing gases for use in the treatment of workpieces by plasma discharges wherein gases from a plurality of reservoirs are fed individually to a mixing chamber by individual supply lines having magnetic valves which are normally closed and are opened for predetermined individual times in response to a pressure in said mixing chamber below a predetermined value whereby the amount of each individual gas fed to said mixing chamber being proportional to its predetermined individual time;

the step of controlling the opening and closing of said magnetic valves so that all magnetic valves reach the halftime of their respective total opening times at the same moment regardless of the total opening time of each magnetic valve.

2. The process defined in claim 1 wherein said step of: controlling said magnetic valves includes the steps of setting the voltage at which each magnetic valve opens or closes, generating a sawtooth voltage which is symmetrical in time and applying said voltage to said magnetic valves whereby a valve is opened when the sawtooth voltage rises to that valve's set voltage and is closed when the sawtooth voltage drops below that value.

3. The process defined in claim 1, wherein metering valves serially connected with said magnetic valves are built into each supply line, the step of calibrating said metering valves by determining the time required to attain a predetermined difference in pressure by means of filling a gas into said mixing chamber, for all metering valves, comparing said time with a given time value and adjusting the metering valves themselves in case of a deviation from a given range of tolerances, while fine adjustments are effected by the variation of a correction element of the electronic actuating device of the magnetic valves.

4. A device for mixing gases, comprising:
a mixing chamber;
a plurality of gas reservoirs, one reservoir for each individual gas;
an outlet line leading from each said reservoir into said mixing chamber;
a pressure controller in said mixing chamber;
a magnetic valve in each of said outlet lines, said magnetic valves being under control of an electronic circuit including a sawtooth generator and a comparator;
said sawtooth generator generating at least one time symmetrical sawtooth voltage pulse whenever said pressure controller signals a pressure in the mixing chamber below a predetermined pressure value;
said comparator having one output terminal connected to a magnetic valve and two input terminals, a reference voltage individually set for each gas being applied to one of said input terminals, said sawtooth voltage being fed into the other input terminal.

5. A device as defined in claim 4, wherein the sawtooth generator is an integrator with the input thereof being connected to the output of a Schmitt trigger, the inputs thereof being connected with said pressure controller and a fixed reference voltage source, whereby all of said magnetic valves reach the halftime of their respective total opening times at the same moment regardless of the total opening time of each magnetic valve.

* * * * *